(12) United States Patent
Votaw et al.

(10) Patent No.: US 10,979,425 B2
(45) Date of Patent: *Apr. 13, 2021

(54) REMOTE DOCUMENT EXECUTION AND NETWORK TRANSFER USING AUGMENTED REALITY DISPLAY DEVICES

(71) Applicant: BANK OF AMERICA CORPORATION, Charlotte, NC (US)

(72) Inventors: Elizabeth S. Votaw, Potomac, MD (US); Michael Ogrinz, Easton, CT (US); Cameron D. Wadley, Charlotte, NC (US); Jisoo Lee, Cortlandt Manor, NY (US); Katherine Dintenfass, Lincoln, RI (US); Graham M. Wyllie, Charlotte, NC (US); Victoria L. Dravneek, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/579,473

(22) Filed: Sep. 23, 2019

(65) Prior Publication Data

US 2020/0021583 A1 Jan. 16, 2020

Related U.S. Application Data

(63) Continuation of application No. 16/176,340, filed on Oct. 31, 2018, now Pat. No. 10,462,131, which is a (Continued)

(51) Int. Cl.
*H04L 29/06* (2006.01)
*G06T 11/60* (2006.01)
(Continued)

(52) U.S. Cl.
CPC ........ *H04L 63/0861* (2013.01); *G02B 27/017* (2013.01); *G06F 3/005* (2013.01);
(Continued)

(58) Field of Classification Search
None
See application file for complete search history.

(56) References Cited

U.S. PATENT DOCUMENTS 5,999,944 A 12/1999 Lipkin
6,408,257 B1 6/2002 Harrington et al.
(Continued)

FOREIGN PATENT DOCUMENTS

CN 103635920 A 3/2014

OTHER PUBLICATIONS

Saettler, M., "Westpac integrates augmented reality into bank account management," http://www.mobilecommercedaily.com/westpac-integrates-augmented-reality-into-bank-account-management, Aug. 6, 2014, 8 pages.
(Continued)

*Primary Examiner* — Henry Tsang
(74) *Attorney, Agent, or Firm* — Michael A. Springs

(57) ABSTRACT

An augmented reality user device includes a display, a physical identification verification engine, a gesture confirmation engine, and in interface. The display overlays a virtual file document onto a tangible object. The physical identification verification engine receives biometric data for a witness and confirms the witness's identity. The display displays a gesture motion from the signor. The gesture capture engine captures a gesture motion from the witness. The gesture capture engine generates a witness digital signature based on the captured gesture motion from the witness. The gesture capture engine generates a witness transfer token, the witness transfer token comprising the
(Continued)

witness digital signature based on the captured gesture from the witness and the witness identity confirmation token. The interface communicates the witness transfer token to a server.

15 Claims, 4 Drawing Sheets

Related U.S. Application Data continuation of application No. 15/353,370, filed on Nov. 16, 2016, now Pat. No. 10,158,634.

(51) Int. Cl.
| | | |
|---|---|---|
| *G06F 3/01* | (2006.01) | |
| *G06K 9/00* | (2006.01) | |
| *G06F 3/0354* | (2013.01) | |
| *G06F 21/64* | (2013.01) | |
| *G06T 11/00* | (2006.01) | |
| *H04L 9/32* | (2006.01) | |
| *H04L 9/08* | (2006.01) | |
| *G02B 27/01* | (2006.01) | |
| *G06F 3/00* | (2006.01) | |
| *G06F 21/00* | (2013.01) | |

(52) U.S. Cl.
CPC ............ *G06F 3/011* (2013.01); *G06F 3/014* (2013.01); *G06F 3/017* (2013.01); *G06F 3/03545* (2013.01); *G06F 21/00* (2013.01); *G06F 21/645* (2013.01); *G06K 9/00161* (2013.01); *G06K 9/00442* (2013.01); *G06K 9/00892* (2013.01); *G06T 11/00* (2013.01); *G06T 11/60* (2013.01); *H04L 9/0866* (2013.01); *H04L 9/3231* (2013.01); *G02B 2027/014* (2013.01); *G02B 2027/0138* (2013.01); *G02B 2027/0141* (2013.01); *G02B 2027/0178* (2013.01); *G02B 2027/0187* (2013.01)

(56) References Cited

U.S. PATENT DOCUMENTS

| | | | |
|---|---|---|---|
| 6,602,075 B2 | 8/2003 | Adams | |
| 6,602,076 B2 | 8/2003 | Adams | |
| 6,625,299 B1 | 9/2003 | Meisner et al. | |
| 6,871,140 B1 | 3/2005 | Florance et al. | |
| 6,941,001 B1 | 9/2005 | Bolle et al. | |
| 7,099,850 B1 | 8/2006 | Mann, II et al. | |
| 7,392,208 B2 | 6/2008 | Morse et al. | |
| 7,680,694 B2 | 3/2010 | Glazer et al. | |
| 7,787,992 B2 | 8/2010 | Pretlove et al. | |
| 7,817,104 B2 | 10/2010 | Ryu et al. | |
| 7,831,471 B2 | 11/2010 | Adams | |
| 7,834,883 B2 | 11/2010 | Adams | |
| 8,069,095 B2 | 11/2011 | Glazer et al. | |
| 8,165,924 B2 | 4/2012 | Smyers et al. | |
| 8,214,387 B2 | 7/2012 | King et al. | |
| 8,285,638 B2 | 10/2012 | Jung et al. | |
| 8,326,704 B2 | 12/2012 | Glazer et al. | |
| 8,385,981 B2 | 2/2013 | Kumaran | |
| 8,396,738 B1 | 3/2013 | Allan et al. | |
| 8,417,625 B2 | 4/2013 | Bannerjee et al. | |
| 8,433,650 B1 | 4/2013 | Thomas | |
| 8,438,001 B2 | 5/2013 | Natarajan et al. | |
| 8,438,110 B2 | 5/2013 | Calman et al. | |
| 8,442,295 B2 | 5/2013 | Sam | |
| 8,442,906 B1 | 5/2013 | Thomas | |
| 8,451,266 B2 | 5/2013 | Hertenstein | |
| 8,577,803 B2 | 11/2013 | Chatterjee et al. | |
| 8,589,255 B2 | 11/2013 | Glazer et al. | |
| 8,601,386 B2 | 12/2013 | Altberg et al. | |
| 8,611,601 B2 | 12/2013 | Calman et al. | |
| 8,612,363 B2 | 12/2013 | Karkanias et al. | |
| 8,635,104 B2 | 1/2014 | Adams | |
| 8,638,363 B2 | 1/2014 | King et al. | |
| 8,660,951 B2 | 2/2014 | Calman et al. | |
| 8,688,594 B2 | 4/2014 | Thomas et al. | |
| 8,718,612 B2 | 5/2014 | Calman et al. | |
| 8,743,145 B1 | 6/2014 | Price | |
| 8,803,916 B1 | 8/2014 | Paczkowski et al. | |
| 8,805,739 B2 | 8/2014 | Brown et al. | |
| 8,810,599 B1 | 8/2014 | Tseng | |
| 8,811,711 B2 | 8/2014 | Calman et al. | |
| 8,890,896 B1 | 11/2014 | Tseng | |
| 8,929,591 B2 | 1/2015 | Calman et al. | |
| 8,989,431 B1 | 3/2015 | Erol et al. | |
| 8,990,235 B2 | 3/2015 | King et al. | |
| 8,990,914 B2 | 3/2015 | Da Cruz Pinto et al. | |
| 9,007,473 B1 | 4/2015 | Worley, III et al. | |
| 9,026,486 B2 | 5/2015 | Doorhy et al. | |
| 9,044,673 B1 | 6/2015 | Ahuja et al. | |
| 9,047,636 B2 | 6/2015 | Ross | |
| 9,066,200 B1 | 6/2015 | Loxam et al. | |
| 9,082,149 B2 | 7/2015 | Argue et al. | |
| 9,092,600 B2 | 7/2015 | Scavezze et al. | |
| 9,092,898 B1 | 7/2015 | Fraccaroli et al. | |
| 9,100,493 B1 | 8/2015 | Zhou et al. | |
| 9,105,011 B2 | 8/2015 | Calman et al. | |
| 9,105,013 B2 | 8/2015 | Chavez | |
| 9,111,383 B2 | 8/2015 | Fein et al. | |
| 9,153,074 B2 | 10/2015 | Zhou et al. | |
| 9,223,950 B2 | 12/2015 | Li et al. | |
| 9,230,367 B2 | 1/2016 | Stroila | |
| 9,251,411 B2 | 2/2016 | Todeschini | |
| 9,251,504 B2 | 2/2016 | Chavez | |
| 9,317,860 B2 | 4/2016 | Calman et al. | |
| 9,331,969 B2 | 5/2016 | Barak et al. | |
| 9,338,589 B2 | 5/2016 | Loxam et al. | |
| 9,342,928 B2 | 5/2016 | Rasane et al. | |
| 9,349,118 B2 | 5/2016 | Chavez | |
| 9,355,123 B2 | 5/2016 | Wnuk et al. | |
| 9,367,878 B2 | 6/2016 | Rao | |
| 9,384,594 B2 | 7/2016 | Maciocci et al. | |
| 2002/0044152 A1 | 4/2002 | Abbott, III et al. | |
| 2009/0235082 A1* | 9/2009 | Garrett | H04L 9/3247 713/178 |
| 2010/0238161 A1 | 9/2010 | Varga et al. | |
| 2011/0134108 A1 | 6/2011 | Hertenstein | |
| 2012/0156668 A1 | 6/2012 | Zelin | |
| 2012/0232966 A1 | 9/2012 | Calman et al. | |
| 2012/0232968 A1 | 9/2012 | Calman et al. | |
| 2012/0232976 A1 | 9/2012 | Calman et al. | |
| 2012/0232977 A1 | 9/2012 | Calman et al. | |
| 2012/0310826 A1 | 12/2012 | Chatterjee | |
| 2013/0166332 A1 | 6/2013 | Hammad | |
| 2013/0226682 A1 | 8/2013 | Grossman | |
| 2014/0040127 A1 | 2/2014 | Chatterjee et al. | |
| 2014/0067712 A1 | 3/2014 | Prasad et al. | |
| 2014/0100994 A1 | 4/2014 | Tatzel et al. | |
| 2014/0125574 A1 | 5/2014 | Scavezze et al. | |
| 2014/0172559 A1 | 6/2014 | Calman et al. | |
| 2014/0181678 A1 | 6/2014 | Louchheim et al. | |
| 2014/0279426 A1 | 9/2014 | Holman et al. | |
| 2014/0330511 A1 | 11/2014 | Tison et al. | |
| 2014/0337175 A1 | 11/2014 | Katzin et al. | |
| 2014/0379468 A1 | 12/2014 | Ganesh et al. | |
| 2015/0012426 A1 | 1/2015 | Purves et al. | |
| 2015/0046284 A1 | 2/2015 | Hart | |
| 2015/0058229 A1 | 2/2015 | Wiacek et al. | |
| 2015/0066722 A1 | 3/2015 | Calman et al. | |
| 2015/0073907 A1 | 3/2015 | Purves et al. | |
| 2015/0082203 A1 | 3/2015 | James et al. | |
| 2015/0086114 A1* | 3/2015 | Todeschini | G06K 9/00 382/189 |
| 2015/0154446 A1 | 6/2015 | Masood et al. | |
| 2015/0186984 A1 | 7/2015 | Loganathan | |
| 2015/0206218 A1 | 7/2015 | Banerjee et al. | |
| 2015/0221151 A1 | 8/2015 | Bacco et al. | |
| 2015/0229750 A1 | 8/2015 | Zhou et al. | |

(56) References Cited

U.S. PATENT DOCUMENTS

| | | | |
|---|---|---|---|
| 2015/0254510 A1 | 9/2015 | McKinnon et al. | |
| 2015/0294322 A1 | 10/2015 | Grigg et al. | |
| 2015/0302027 A1 | 10/2015 | Wnuk et al. | |
| 2015/0324562 A1 | 11/2015 | Scavezze et al. | |
| 2015/0339468 A1* | 11/2015 | Son, II | G06F 3/017 726/19 |
| 2015/0348329 A1 | 12/2015 | Carre et al. | |
| 2015/0363761 A1 | 12/2015 | Grigg et al. | |
| 2015/0363764 A1 | 12/2015 | Grigg et al. | |
| 2015/0371445 A1 | 12/2015 | Karrer Walker et al. | |
| 2016/0049095 A1 | 2/2016 | Yannier et al. | |
| 2016/0063484 A1 | 3/2016 | Carpenter et al. | |
| 2016/0063517 A1 | 3/2016 | Sorensen | |
| 2016/0078277 A1* | 3/2016 | Sprigg | G06F 1/1686 382/119 |
| 2016/0078449 A1 | 3/2016 | Banerjee | |
| 2016/0098936 A1 | 4/2016 | Solomon | |
| 2016/0171767 A1 | 6/2016 | Anderson | |
| 2016/0188861 A1 | 6/2016 | Todeschini | |
| 2016/0189426 A1* | 6/2016 | Thomas | G06F 3/011 345/633 |
| 2016/0206960 A1 | 7/2016 | Allen et al. | |
| 2016/0210784 A1 | 7/2016 | Ramsby et al. | |
| 2016/0210790 A1 | 7/2016 | Rasane et al. | |
| 2016/0217623 A1 | 7/2016 | Singh | |
| 2017/0140486 A1* | 5/2017 | Saxena | G06Q 50/188 |

OTHER PUBLICATIONS

Dolan, H. et al., "Facilitating Digital Data Transfers Using Augmented Reality Display Devices," U.S. Appl. No. 15/353,005, filed Nov. 16, 2016, 50 pages.

Johansen, J. N. et al., "Real World Gamification Using Augmented Reality User Devices ," U.S. Appl. No. 15/377,690, filed Dec. 13, 2016, 70 pages.

Adams, A. J. et al., "Virtual Reality Dynamic Authentication," U.S. Appl. No. 15/367,590, filed Dec. 2, 2016, 58 pages.

Lee, J. et al., "Contextual Augmented Reality Overlays," U.S. Appl. No. 15/363,388, filed Nov. 29, 2016, 50 pages.

Waldron, W. H. et al., "Virtual Assessments Using Augmented Reality User Devices," U.S. Appl. No. 15/364,927, filed Nov. 30, 2016, 85 pages.

Votaw, E. S. et al., "Remote Document Execution and Network Transfer Using Augmented Reality Display Devices," U.S. Appl. No. 15/353,370, filed Nov. 16, 2016, 42 pages.

Dolan, H. et al., "Augmented Reality Headset and Digital Wallet," U.S. Appl. No. 15/363,692, filed Nov. 29, 2016, 41 pages.

Johansen, J. N., "Facilitating Dynamic Across-Network Location Determination Using Augmented Reality Display Devices," U.S. Appl. No. 15/372,909, filed Dec. 8, 2016, 44 pages.

Ogrinz, M. et al., "Facilitating Network Security Analysis Using Virtual Reality Display Devices." U.S. Appl. No. 15/367,896, filed Dec. 2, 2016, 44 pages.

Dintenfass, K., "Property Assessments Using Augmented Reality User Devices," U.S. Appl. No. 15/367,435, filed Dec. 2, 2016, 81 pages.

Wadley, C. D. et al., "Facilitating Across-Network, Multi-User Sessions Using Augmented Reality Display Devices," U.S. Appl. No. 15/397,086, filed Jan. 3, 2017, 49 pages.

Dintenfass, K., "Geo-targeted Property Analysis Using Augmented Reality User Devices," U.S. Appl. No. 15/367,554, filed Dec. 2, 2016, 80 pages.

Adams, A. J. et al., "Augmented Reality Dynamic Authentication for Electronic Transactions," U.S. Appl. No. 15/367,551, filed Dec. 2, 2016, 57 pages.

Lee, J., "Facilitating Digital Data Transfers Using Virtual Reality Display Devices," U.S. Appl. No. 15/363,185, filed Nov. 29, 2016, 52 pages.

Dintenfass, K., "Real Estate Property Project Analysis Using Augmented Reality User Devices," U.S. Appl. No. 15/367,822, filed Dec. 2, 2016, 81 pages.

Adams, A. J. et al., "Augmented Reality Dynamic Authentication,"U.S. Appl. No. 15/367,502, filed Dec. 2, 2016, 57 pages.

Waldron, W. H. et al., "Virtual Behavior Training Using Augmented Reality User Devices," U.S. Appl. No. 15/377,795, filed Dec. 13, 2016, 71 pages.

Dolan, H. et al., "User Authentication and Authorization for Electronic Transaction," U.S. Appl. No. 15/363,495, filed Nov. 29, 2016, 41 pages.

Waldron, W. H. et al., "Geolocation Notifications Using Augmented Reality User Devices," U.S. Appl. No. 15/365,272, filed Nov. 30, 2016, 85 pages.

Waldron, W. H. et al., "Object Recognition and Analysis Using Augmented Reality User Devices," U.S. Appl. No. 15/365,511, filed Nov. 30, 2016, 86 pages.

Wadley, C. D. et al., "Facilitating Across-Network Handoffs for Devices Using Augmented Reality Display Devices," U.S. Appl. No. 15/397,031, filed Jan. 3, 2017, 49 pages.

Wadley, C. D. et al., "Facilitating Across-Network Handoffs for an Assistant Using Augmented Reality Display Devices," U.S. Appl. No. 15/397,125, filed Jan. 3, 2017, 48 pages.

* cited by examiner

REMOTE DOCUMENT EXECUTION AND NETWORK TRANSFER USING AUGMENTED REALITY DISPLAY DEVICES

CROSS-REFERENCE TO RELATED APPLICATIONS

This application is a continuation of U.S. Patent Application No. of U.S. patent application Ser. No. 16/176,340 filed Oct. 31, 2018, by Elizabeth S. Votaw et al., and entitled "Remote Document Execution and Network Transfer Using Augmented Reality Display Devices," which is a continuation of U.S. Patent Application No. of U.S. patent application Ser. No. 15/353,370 filed Nov. 16, 2016, by Elizabeth S. Votaw et al., and entitled "Remote Document Execution and Network Transfer Using Augmented Reality Display Devices," which is now U.S. Pat. No. 10,158,635 issued Dec. 18, 2018, which are incorporated herein by reference.

TECHNICAL FIELD

The present disclosure relates generally to performing operations using an augmented reality display device that overlays graphic objects with objects in a real scene.

BACKGROUND

Remotely executing documents causes several technical challenges. Executing documents remotely may require transferring information across a network, thus creating security risks. Further, transmitting information across a network may cause network bottlenecks. Thus, it is desirable to provide the ability to securely transfer information and resources among users across a network without causing transmission delays or failures.

SUMMARY

In one embodiment, an augmented reality system includes a server, a first augmented reality user device for a signor, and a second augmented reality user device for a notary. The server includes a memory operable to store a virtual file folder, the virtual file folder comprising a virtual file document.

The first augmented reality user device for a signor includes a first head-mounted display, a first physical identification verification engine, and a first capture engine. The first head-mounted display overlays the virtual file document onto a tangible object in real-time. The first physical identification verification engine receives biometric data for the signor. The first physical identification verification engine confirms the signor's identity by comparing the received biometric data for the signor to predetermined biometric data for the signor. The first physical identification verification engine generates a signor identity confirmation token indicating the confirmation of the signor's identity. The first gesture capture engine captures a gesture motion from the signor, the gesture motion representing a signature on the virtual file document. The first gesture capture engine generates a signor digital signature based on the captured gesture from the signor. The first gesture capture engine generates a signor transfer token, the signor transfer token comprising the signor digital signature and the signor identity confirmation token.

A second augmented reality user device includes a second head-mounted display, a second physical identification verification engine, a gesture confirmation engine, and a second gesture capture engine. The second head-mounted display overlays the virtual file document onto a tangible object in real-time. The second physical identification verification engine receives biometric data for the notary and confirms the notary's identity by comparing the received biometric data for the notary to predetermined biometric data for the notary. The second physical identification verification engine generates a notary identity confirmation token indicating the confirmation of the notary's identity. The gesture confirmation engine receives the signor identity confirmation token, communicates the signor identity confirmation token to the notary, and displays, via the head-mounted display, the gesture motion from the signor, the gesture motion from the signor displayed on the virtual file document. The second gesture capture engine captures a gesture motion from the notary, the gesture motion from the notary representing a signature on the virtual file document. The second gesture capture engine generates a notary digital signature based on the captured gesture motion from the notary. The second gesture capture engine generates a notary transfer token, the notary transfer token comprising the notary digital signature based on the captured gesture from the notary and the notary identity confirmation token.

The server further includes an interface and a processor. The interface receives the signor transfer token and the notary transfer token. The processor generates an executed document using the signor transfer token, the notary transfer token, and the virtual file document and stores the executed document in the virtual file folder.

In another embodiment, the disclosure includes an augmented reality user device that includes a head-mounted display, a physical identification verification engine, a gesture confirmation engine, and an interface. The head-mounted display overlays a virtual file document onto a tangible object in real-time. The physical identification verification engine receives biometric data for a witness and confirms the witness's identity by comparing the received biometric data for the witness to predetermined biometric data for the witness. The physical identification verification engine generates a witness identity confirmation token indicating the confirmation of a witness's identity. The gesture confirmation engine receives a signor identity confirmation token and communicates the signor identity confirmation token to the witness. The head-mounted display displays a gesture motion from the signor, the gesture motion from the signor displayed on the virtual file document. The gesture capture engine captures a gesture motion from the witness, the gesture motion from the witness representing a signature on the virtual file document. The gesture capture engine generates a witness digital signature based on the captured gesture motion from the witness. The gesture capture engine generates a witness transfer token, the witness transfer token comprising the witness digital signature based on the captured gesture from the witness and the witness identity confirmation token. The interface communicates the witness transfer token to a server.

The present disclosure presents several technical advantages. In one embodiment, an augmented reality user device employs transfer tokens to allow data transfers to be executed using less information than other existing systems. By using less information to perform data transfers, the augmented reality user device reduces the amount of data that is communicated across the network. Reducing the amount of data that is communicated across the network improves the performance of the network by reducing the amount of time network resource are occupied.

The augmented reality user device generates transfer tokens based on biometric data which improves the performance of the augmented reality user device by reducing the amount of information required to identify a person, authenticate the person, and facilitate a data transfer.

Transfer tokens also provide another technical advantage by allowing a user to make a data transfer without prior knowledge about another user's network or network services by using transfer tokens. Additionally, transfer tokens are encoded or encrypted to obfuscate and mask information being communicated across a network. Masking the information being communicated protects users and their information in the event of unauthorized access to the network and/or data occurs.

Another technical advantage is the augmented reality user device uses a combination of facial recognition, voice recognition, and/or predetermined signal or code to perform a multistep authentication process to authenticate a user's identity prior to making a data transfer. This feature may be particularly useful if a user is vision impaired. The ability for the augmented reality user device to authenticate both the user and another person provides improved information security by controlling whom has access to sensitive information.

Another technical advantage is an augmented reality user device's ability to store details for a transfer and to delay the transfer until conditions for triggering a transfer are satisfied. The augmented reality user device stores details and triggering conditions to provides the user the ability to delay a transfer, for example, when resources are unavailable, without requiring the user to reenter details about the transfer. Also, the augmented reality user device allows transfers to be made automatically or spontaneously when resources are available without requiring the user to preschedule the transfer without knowledge of whether the resources will be available.

Certain embodiments of the present disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
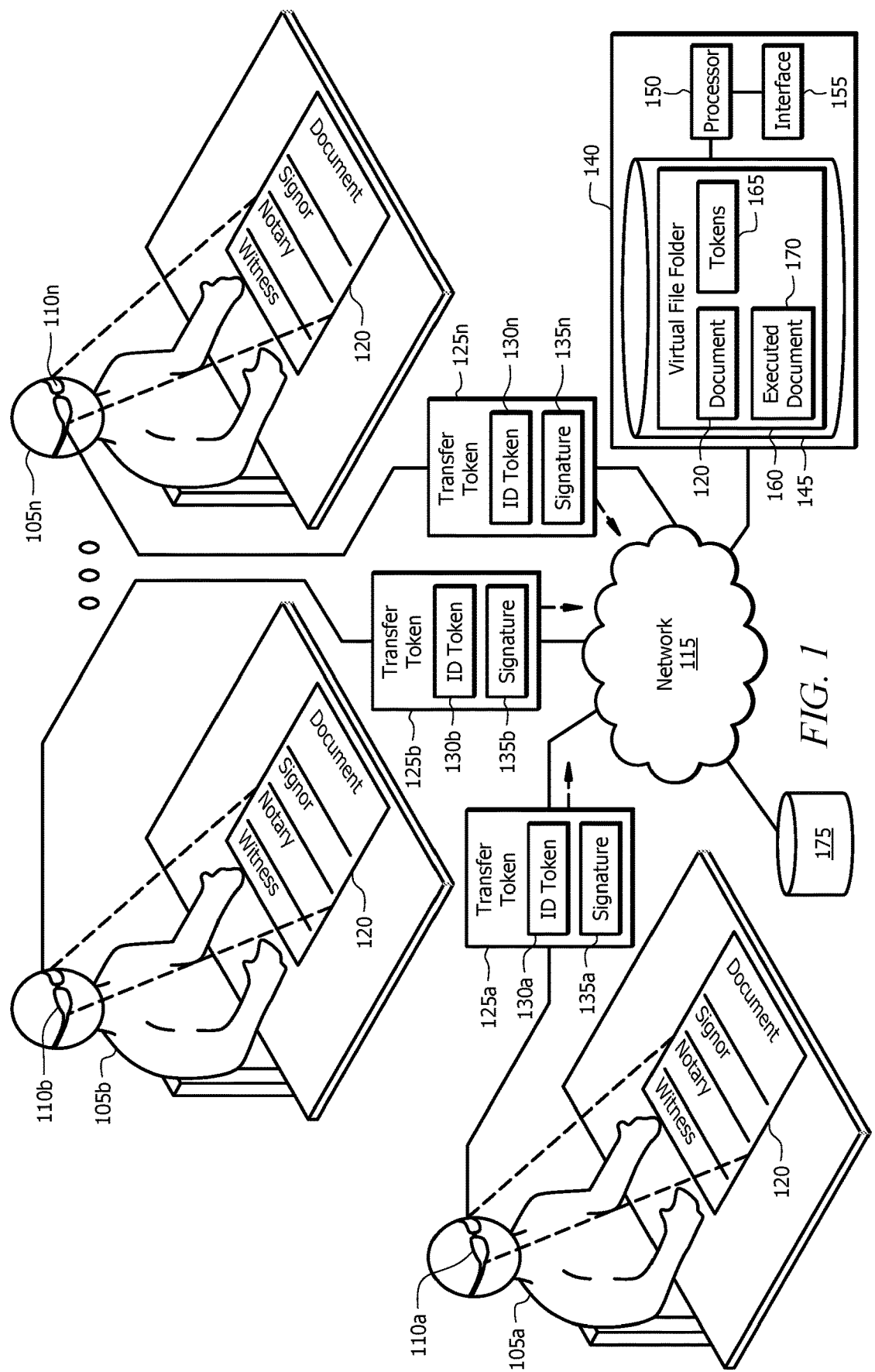
FIG. 1 illustrates an augmented reality system configured to facilitate remote document execution, in particular embodiments.

Transferring data and information across a network causes several technical challenges. Networks are susceptible to attacks by unauthorized users trying to gain access to sensitive information being communicated across the network. Unauthorized access to a network may compromise the security of the data and information being communicated across the network. One technical solution for improving network security is the generation and usage of transfer tokens that allow a user to send only information that is pertinent to executing a transfer between multiple people. The transfer token may be encoded or encrypted to obfuscate the information being communicated by the transfer token. Using tokens to mask information that is communicated across the network may protect the users and their information in the event unauthorized access to the network and/or data occurs. The transfer tokens also allow for data transfers to be executed using less information than other existing systems, and thereby reduces the amount of data that is communicated across the network. Reducing the amount of data that is communicated across the network may improve the performance of the network by reducing the amount of time network resource are occupied.

Another technical challenge associated with transferring data and information across a network is that people may be a part of different institutions that are members of different networks and/or have access to different types of network services for sharing information and transferring resources with each other. Some networks may not support certain types of network resources which may cause challenges when transferring data and information across different networks. Transfer tokens provide a technical solution by allowing a user to make a transfer without prior knowledge about another user's network or network services by using transfer tokens.

Another technical challenge associated with transferring data and information across a network is the inability to authenticate both parties prior to making a transfer. Existing solutions may allow a user to identify themselves, but do not provide a mechanism that allows the user to identify and authenticate another person. The inability to identify and authenticate another person makes transferring data and information vulnerable to attacks such as identity theft. For example, someone can pose as another person to spoof a user and to request a transfer by the user. A technical solution to identity theft is the integration of one or more mechanisms that allow a user to identify and authenticate another person using verifiable information. For example, using a combination of facial recognition, voice recognition, and predetermined signal or codes allows a user to authenticate a person. The ability for the user to authenticate another user provides improved information security by controlling who access to sensitive information and ensuring that a document is properly executed by the correct parties.

Existing systems for remotely executing documents and verifying signor identity are limited to executing documents at a central geographical location at a specific time. For example, to execute a document before a notary public, a signor must be in the same geographical location as the notary public and both parties must be at the geographical location at the same time. Some existing systems allow a signor to remotely execute a document. However, in these instances, existing systems perform no or inadequate identity verification. Additionally, these systems do not allow parties to view other parties executing the documents in real time or at a later time. Thus, existing systems limit the user ability to accommodate executing documents remotely and transferring data about the document execution.

One technical solution is to provide a system that verifies a signor's identity, allows the user to execute the document remotely, and transfers data that can be used to verify the document execution through a network. For example, an augmented reality user device may verify a signor's identity.

The augmented reality user device may virtually display a document for execution by the signor. The signor users the augmented reality user device to express a gesture motion that indicates that the signor executed the document. For example, the signor may perform a signing gesture motion using a stylus and/or a data glove. As another example, a signor may execute the document with a verbal command. The augmented reality user device captures the gesture motion. The augmented reality user device transfers the gesture motion and/or the identify verification via encrypted transfer tokens. A witnesses, such as a notary public, a witness, and/or any other suitable third party, may view the transfer tokens from the signor's augmented reality user device, confirm that the signor execute the document, and execute the document. The witnesses may execute the document in real time (e.g., substantially the same time as the signor) or at a later time. For example, a witness may execute the document in real-time and a notary may execute the document at a later time.

Once each party has executed the document, a server may generate an executed document that includes the original document and transfer tokens from each party that executed the document. For example, the server may combine each transfer token and the document to generate the executed document. In some embodiments, the executed document may include a visual representation of the document and each party's digital signature.

FIG. 1 illustrates an augmented reality system 100 configured to facilitate remote document execution. As illustrated in FIG. 1, system 100 includes users 105, augmented reality ("AR") user devices 110, network 115, transfer tokens 125, server 140, and biometric database 175. In particular embodiments, system 100 may increase security and decrease network bandwidth bottlenecking associated with remote document execution.

System 100 may be utilized by users 105a-n, where n is any suitable number. Users 105 generally execute documents using AR user device 110. For example, a user 105 may execute virtual file document 120 to facilitate creating executed document 170. User 105 may be any suitable person executing any suitable type of document. For example, users 105 may include a person required to execute a document. As another example, users 105 may include a witness. As yet another example, users 105 may include a notary public. In some embodiments, document 120 may be a document associated with a loan. For example, a first user 105 may request a loan and be required to execute a document 120 to receive the loan. A second user 105 may be a witness. For example, the witness may execute document 120 to indicate confirmation that the first user 105 executed the document. In some embodiments, a third user 105 may be a notary public that also executes document 120.

System 100 comprises AR user devices 110a-n, where n is any suitable number. For example, each user 105 may be associated with an AR user device 110. As yet another example, a plurality of users 105 may each use a single AR user device 110. In the illustrated embodiment, AR user device 110 is configured as a head-mounted wearable device. For example, a wearable device is integrated into an eyeglass structure, a visor structure, a helmet structure, a contact lens, or any other suitable structure. In some embodiments, AR user device 110 may be or may be integrated with a mobile user device. Examples of mobile user devices include, but are not limited to, a mobile phone, a computer, a tablet computer, and a laptop computer. Additional details about AR user device 110 are described in FIG. 3. The AR user device 110 is configured to display a virtual file document 120, to confirm a user's identity using, e.g., a biometric scanner such as a retinal scanner, a fingerprint scanner, a voice recorder, and/or a camera, capture a user's gesture motion such as a hand gesture to create a digital signature, and transfer tokens, such as transfer tokens 125 to other components of system 100. Examples of an augmented reality digital data transfer using AR user device 110 are described in more detail below and in FIG. 4.

AR user device 110 is configured to confirm one or more user's 105 identity. AR user device 110 may comprise one or more biometric scanners. For example, AR user device 110 may comprise a retinal scanner, a fingerprint scanner, a voice recorder, and/or a camera. AR user device 110 may comprise any suitable type of device to gather biometric measurements. AR user device 110 uses biometric measurements received from the one or more biometric scanners to confirm a user's 105 identity. For example, AR user device may compare the received biometric measures to predetermined biometric measurements for user 105. In some embodiments, AR user device 110 receives the predetermined biometric measures from biometric database 175. Once AR user device 110 confirms a user's 105 identity. AR user device 110 may generate an identification token 130 that indicates that the user's 105 identity has been confirmed.

Biometric database 175 generally stores biometric data for one or more users 105. For example, biometric database 175 may store biometric measurements for one or more users 105. Biometric measurements may include fingerprint measurements, retinal measurements, voice measurements, and or image measurements such as facial recognition measurements. Biometric database 175 may be a single database or any number of databases.

AR user device 110 is configured to display virtual file document 120. AR user device 110 may create a virtual overlay of virtual file document 120 that may be viewed by one or more users 105. For example, AR user device 110 creates a virtual overlay of virtual file document 120 onto a tangible object in a real scene. AR user device 110 may capture changes made to the virtual file document 120. For example, one or more users 105 may perform a gesture motion, such as signing motion. AR user device 110 may receive the gesture motion and generate digital signature 135 based on the gesture motion that indicates that a user 105 executed the virtual file document 120. AR user device 110 may comprise input devices such as a camera, a stylus, a data glove, and/or any other suitable type of device that may receive input from a user 105. The input device may capture a user's 105 gesture motion. For example, a user 105 may make a signing motion with their hand. As another example, a user 105 may verbally indicate that the user 105 is executing the document. The captured gesture motion is used to generate digital signature 135 that is transmitted to other components of system 100.

Other AR user devices 110 may display the captured gesture motion to one or more other user's 105, allowing other users 105 to view the first user execute virtual file document 120. For example, other AR user devices 110 may display the first user executing virtual file document 120 in real time. As another example, other AR user devices may display a recording of the first user executing virtual file document 120 at a previous time. The other AR user device's 110 may receive digital signature 135 and create a virtual overlay (or any other suitable type of recreation) of the gesture motion. This allows two users 105 to be located in geographically distinct locations and view virtual file document 120, and any changes to the document (such as signatures), in real time. In another embodiment, one or more users 105 may view and modify virtual file document 120 at a first time and one or more other users 105 may view the virtual file document 120 and changes made to the document at a second, later time. For example a first AR user device 110 associated with a first user 105 may record the first user 105 executing virtual file document 120. A second user, such as a notary or witness, may view the recording at a second, later time to confirm that the first user 105 executed virtual file document 120.

In particular embodiments, AR user device 110 generates a transfer token 125. Generally, a transfer token 125 includes both identification token 130 and digital signature 135. Transfer token 125 generally facilitates creating executed document 170. An AR user device 110 may transmit transfer token 125 to other user's 105. Users 105, such as a witness and/or a notary, may view transfer token 125 from a user 105 who is a signor. For example, a witness may utilize transfer token 125 to confirm the signor's identity. The witness may further utilize transfer token to view the signor execute virtual file document 120, either in real-time or at a later time. As another example, an AR user device 110 may transmit transfer token 125 to server 140. Server 140 may use one or more transfer tokens 125 to generate executed document 170. For example, server 140 may store virtual file document 120 and one or more transfer tokens 125 in a single file to generate executed document 170.

Network 115 facilitates communication between and amongst the various components of system 100. This disclosure contemplates network 115 being any suitable network operable to facilitate communication between the components of system 100. Network 115 may include any interconnecting system capable of transmitting audio, video, signals, data, messages, or any combination of the preceding. Network 115 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components.

Server 140 generally communicates virtual file document 120 to one or more users 105 and generates executed document 170. As illustrated, server 140 includes memory 140, processor 150, and interface 155. This disclosure contemplates memory 140, processor 150, and interface 155 being configured to perform any of the operations of server 140 described herein. In particular embodiments, server 140 may increase security and decrease network bandwidth bottlenecking associated with remote document execution.

Processor 150 is any electronic circuitry, including, but not limited to microprocessors, application specific integrated circuits (ASIC), application specific instruction set processor (ASIP), and/or state machines, that communicatively couples to memory 140 and interface 155 and controls the operation of server 140. Processor 150 may be 8-bit, 16-bit, 32-bit, 64-bit or of any other suitable architecture. Processor 150 may include an arithmetic logic unit (ALU) for performing arithmetic and logic operations, processor registers that supply operands to the ALU and store the results of ALU operations, and a control unit that fetches instructions from memory 140 and executes them by directing the coordinated operations of the ALU, registers and other components. Processor 150 may include other hardware and software that operates to control and process information. Processor 150 executes software stored on memory 140 to perform any of the functions described herein. Processor 150 controls the operation and administration of server 140 by processing information received from network 115, AR user device(s) 110, and memory 140. Processor 150 may be a programmable logic device, a microcontroller, a microprocessor, any suitable processing device, or any suitable combination of the preceding. Processor 130 is not limited to a single processing device and may encompass multiple processing devices.

Interface 155 represents any suitable device operable to receive information from network 115, transmit information through network 115, perform suitable processing of the information, communicate to other devices, or any combination of the preceding. For example, interface 155 transmits data to server 140. As another example, interface 155 receives information from AR user devices 110. As a further example, interface 155 receives data from biometric database 175. Interface 155 represents any port or connection, real or virtual, including any suitable hardware and/or software, including protocol conversion and data processing capabilities, to communicate through a LAN, WAN, or other communication systems that allows server 140 to exchange information with AR user devices 110, biometric database 175, and/or other components of system 100 via network 115.

Memory 140 may store, either permanently or temporarily, data, operational software, or other information for processor 150. Memory 140 may include any one or a combination of volatile or non-volatile local or remote devices suitable for storing information. For example, memory 140 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in memory 140, a disk, a CD, or a flash drive. In particular embodiments, the software may include an application executable by processor 150 to perform one or more of the functions described herein. In particular embodiments, memory 140 may store virtual file folder 160. This disclosure contemplates memory 135 storing any of the elements stored in biometric database 175, server 140, and/or any other suitable components of system 100. In the illustrated embodiment, memory 140 comprises virtual file folder 160. Virtual file folder 160 may include virtual file document 120, executed document 170, and/or tokens 165.

Generally, server 140 sends virtual file document 120 to one or more AR user devices 110, receives tokens from one or more AR user devices 110, and uses the received tokens to generate executed document 170. For example, server 140 communicates virtual file document to a first user 105a who is a signor and a second user 105b who is a witness. AR user devices 110b and 110b create a virtual overlay of virtual file document 120 for the signor and the witness, respectively. AR user device 110b authenticates the signor's identity and receives a gesture motion from the signor (e.g., a signing motion) to indicate that the signor executed virtual file document 120 as previously discussed. AR user device 110b creates a transfer token 125a that includes identity token 130b and digital signature 135a. AR user device 110b receives transfer token 125a from AR user device 110a. The witness may verify the signor's identity using identification token 130. The witness may utilize transfer token 125a to verify that the witness executed virtual file document 120

(e.g., by viewing the signor execute virtual file document 120). Once the witness verifies the signor's identity and digital signature, AR user device 110b may generate transfer token 125b that includes identification token 130b and digital signature 135b for the witness as previously discussed.

Each AR user device 110 may communicate a transfer token 125 to server 140 where they are stored in memory 160 as tokens 165. Tokens 165 may include one or more identification tokens 130, one or more digital signatures 135, one or more transfer tokens 125, and/or any other suitable type of token. Server 140 utilizes tokens 165 and virtual file document 120 to create executed document 170. Executed document 170 is generally a virtual file document 120 that has been executed by one or more users 150. For example, executed document 170 is a document that is executed by all required users 105. Executed document 170 may include virtual file document 120 and a transfer token 125 for each user 105 that executes virtual file document 120. For example, server 140 may generate a single file comprising virtual file document 120 and one or more tokens 165 to generated executed document 170. As another example, server 140 may extract one or more digital signatures 135 from tokens 165 and overlay the digital signatures 135 onto virtual file document 120 to create executed document 170. Executed document 170 may indicate that all of the required parties to an agreement executed the agreement.

In an exemplary embodiment of operation, a first AR user device 110 confirms a first user's 105 identity and generates a first identification token 130. For example, the first AR user device 110 receives biometric data from the first user 105. The biometric data is compared to predetermined biometric data for the first user 105 to authenticate the first user's 105 identity. The first AR user device receives virtual file document 120 from server 140 and displays virtual file document 120 to the first user 105 by creating a virtual overlay of virtual file document 120 onto a tangible medium. The first user 105 executes the document using a gesture motion, such as a signing motion, that represent a signature on virtual file document 120. The first AR user device 110 captures the gesture motion and uses the gesture motion to generate digital signature 135. The first AR user device generates a first transfer token 125 using the first identification token 130 and the first digital signature 135. The first AR user device 110 transmits the first transfer token 125 to server 140.

In this exemplary embodiment, the first AR user device and/or server 140 may determine whether a second user 105 is available to witness the first user's 105 execution of virtual file document 120 in real time. For example, a witness could be a witness or a notary public. If a second user 105 is available to witness the first user's 105 execution of virtual file document 120, a second AR user device 110 confirms the second user's 105 identity and generates a second identification token 130. The second AR user device 110 communicates the first identification token 130. The second AR user device 110 may display the first user's 105 gesture motion in real time. After the second user 105 reviews the first identification token 130 to confirm the first user's 105 identity and witnesses the first user 105 execute virtual file document 120 in real time, the second user 105 may express a gesture motion, such as a signing motion, that represents the second user's 105 signature on virtual file document 120. The second AR user device 110 creates a second digital signature 135 based on the gesture motion. The second AR user device 110 generates a transfer token 125 that includes the second identification token 130 and the second digital signature 135 and transmits the second transfer token to server 140. Server 140 generates executed document 170 using virtual file document 120 and the first and second transfer tokens 125. For example, server 140 may generate a single file comprising virtual file document 120 and one or more tokens 165 to generated executed document 170. As another example, server 140 may extract one or more digital signatures 135 from tokens 165 and overlay the digital signatures 135 onto virtual file document 120 to create executed document 170.

In another exemplary embodiment, a second user 105 may not be available to witness the first user 105 execute the document in real time. In this embodiment, server 104, the first AR user device 110, the second AR user device 110, and/or any other suitable component of system 100 may store all or a portion of the first transfer token 125. When a second user 105 is available, the second AR user device 110 may receive and/or display information associated with the first transfer token 125 to the second user 105. The second user 105 may then execute virtual file document 120 as described above. System 100 may facilitate remote document signing by any number of users 105. This disclosure contemplates some users 105 signing the document in real time while other users 105 sign at a second, later time.

Modifications, additions, or omissions may be made to system 100 without departing from the scope of the invention. For example, system 100 may include any number of processors 150, memory 145, AR user devices 110, and/or biometric databases 175. As a further example, components of system 100 may be separated or combined. For example, server 140 and/or biometric database 175 may be combining with one or more AR user devices 110.

Figure 2:
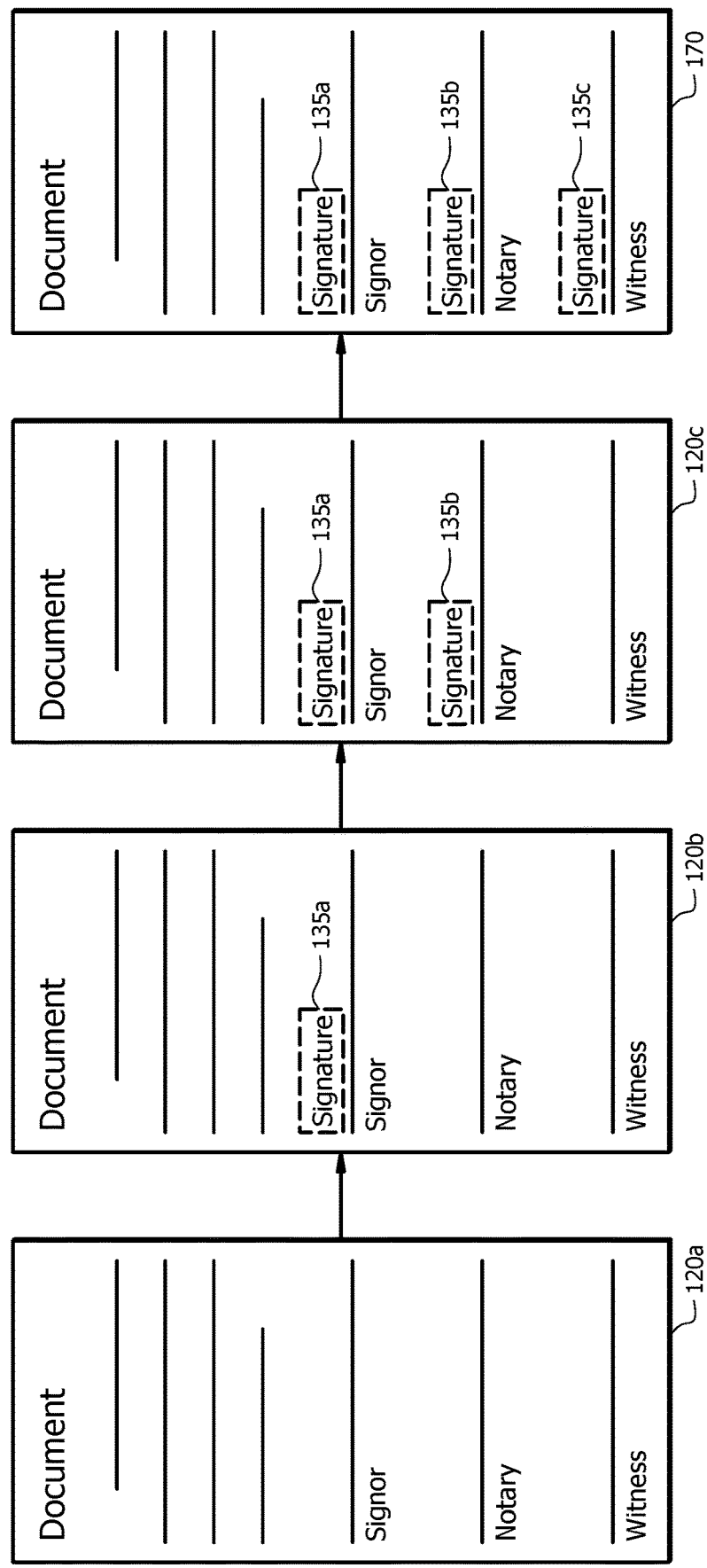
FIG. 2 illustrates a virtual file document at various stages of execution, in particular embodiments.

FIG. 2 illustrates a virtual file document 120 at various stages of execution, in particular embodiments. The progression beings with an unsigned virtual file document 120. Generally virtual file document 120 is stored in server 140 and communicated to a first AR user device 110 associated with a first user 105 who is a signor. The first AR user device 110 displays virtual file document 120b to the first user 105. The first user 105 executes the document, and the first AR user device 110 generates a first digital signature 135a as previously discussed. The first AR user device 110 may communicate the digital signature to server 140 and/or a second AR user device 110 as previously discussed (e.g., as part of transfer token 125).

The second AR user device 110 displays virtual file document 120b for a second user 105. In some embodiments, the second user 105 is a witness. In particular embodiments, virtual file document 120b is identical to virtual file document 120b except that the second AR user device 110 displays the first user's 105 digital signature 135a on document 120b. The second user 105 confirms the first user's 105 identity (e.g., using identification token 130). The second user 105 confirms the first user's 105 digital signature 135a (e.g., by viewing the first user 105 execute virtual file document 120 in real-time or by viewing a recording of the first user 105 generating the digital signature). Once the second user 105 confirms the first user's 105 identity and digital signature 135a, the second user 105 may perform a gesture motion to execute virtual file document 120. The second AR user device 110 may generate a second digital signature 135b and communicate the second digital signature 135b to a third a third AR user device 110 and/or server 104.

The third AR user device 110 displays virtual file document 120c for a third user 105. In some embodiments, the third user 105 is a notary public. In particular embodiments, virtual file document 120c is identical to virtual file documents 120a and/or 120b except that the third AR user device 110 may display the first user's 105 digital signature 135a and/or the second user's 105 digital signature 135b on virtual file document 120c. The third user 105 confirms the first user's 105 identity and/or the second user's 105 identity (e.g., using identification token 130). The third user 105 confirms the first user's 105 digital signature 135a and/or the second user's 105 digital signature 135b (e.g., by viewing the first user 105 and/or the second user 105 generate the digital signatures 135 in real-time or by viewing a recording of the first user 105 and/or the second user 105 generating the digital signatures 135). Once the third user 105 confirms the identities and/or digital signatures 135, the third user 105 may execute a gesture motion to execute the virtual file document 120. The third AR user device 110 may generate a third digital signature 135c and communicate the third digital signature 135c to server 104.

Server 140 receives digital signatures for each party to the document. For example server 140 receives transfer tokens 125a, 125b, and 125c that include digital signatures 135a, 135b, and 135c, respectively. Server 140 may then combine the digital signatures and virtual file document 120 to create executed document 170. In some embodiments, executed document 170 may include additional information such as one or more identification tokens 130 and/or transfer tokens 125.

Figure 3:
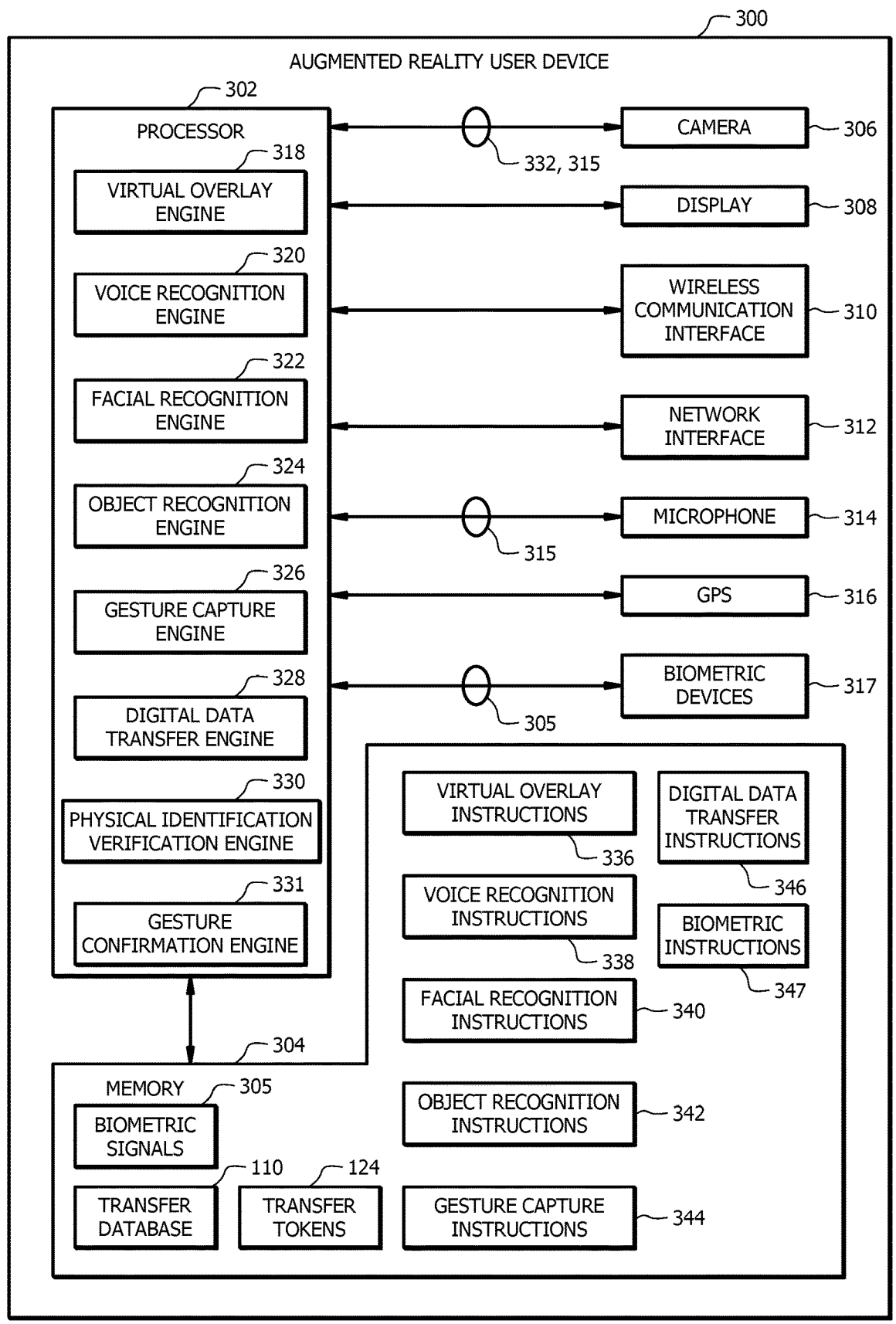
FIG. 3 illustrates an augmented reality user device employed by the augmented reality system, in particular embodiments.

FIG. 3 illustrates an augmented reality user device employed by the augmented reality system, in particular embodiments. AR user device 110 may be configured to confirm user 105's identity, receive and display virtual file document 120 to user 105, receive user 105's digital signature for virtual file document 120, and communicate identity tokens 130 and digital signatures 135 to information to server 140.

AR user device 110 comprises a processor 302, a memory 304, a camera 306, a display 308, a wireless communication interface 310, a network interface 312, a microphone 314, a global position system (GPS) sensor 316, and one or more biometric devices 317. The AR user device 110 may be configured as shown or in any other suitable configuration. For example, AR user device 110 may comprise one or more additional components and/or one or more shown components may be omitted.

Examples of the camera 306 include, but are not limited to, charge-coupled device (CCD) cameras and complementary metal-oxide semiconductor (CMOS) cameras. The camera 306 is configured to capture images 332 of people, text, and objects within a real environment. The camera 306 may be configured to capture images 332 continuously, at predetermined intervals, or on-demand. For example, the camera 306 may be configured to receive a command from a user to capture an image 332. In another example, the camera 306 is configured to continuously capture images 332 to form a video stream of images 332. The camera 306 may be operably coupled to a facial recognition engine 322 and/or object recognition engine 324 and provides images 332 to the facial recognition engine 322 and/or the object recognition engine 324 for processing, for example, to identify people, text, and/or objects in front of the user. Facial recognition engine 322 may confirm a user's 105 identity.

The display 308 is configured to present visual information to a user in an augmented reality environment that overlays virtual or graphical objects onto tangible objects in a real scene in real-time. In an embodiment, the display 308 is a wearable optical head-mounted display configured to reflect projected images and allows a user to see through the display. For example, the display 308 may comprise display units, lens, semi-transparent mirrors embedded in an eye glass structure, a visor structure, or a helmet structure. Examples of display units include, but are not limited to, a cathode ray tube (CRT) display, a liquid crystal display (LCD), a liquid crystal on silicon (LCOS) display, a light emitting diode (LED) display, an active matrix OLED (AMOLED), an organic LED (OLED) display, a projector display, or any other suitable type of display as would be appreciated by one of ordinary skill in the art upon viewing this disclosure. In another embodiment, the display 308 is a graphical display on a user device. For example, the graphical display may be the display of a tablet or smart phone configured to display an augmented reality environment with virtual or graphical objects overlaid onto tangible objects in a real scene in real-time.

Examples of the wireless communication interface 310 include, but are not limited to, a Bluetooth interface, an RFID interface, an NFC interface, a local area network (LAN) interface, a personal area network (PAN) interface, a wide area network (WAN) interface, a Wi-Fi interface, a ZigBee interface, or any other suitable wireless communication interface as would be appreciated by one of ordinary skill in the art upon viewing this disclosure. The wireless communication interface 310 is configured to allow the processor 302 to communicate with other devices. For example, the wireless communication interface 310 is configured to allow the processor 302 to send and receive signals with other devices for the user (e.g. a mobile phone) and/or with devices for other people. The wireless communication interface 310 is configured to employ any suitable communication protocol.

The network interface 312 is configured to enable wired and/or wireless communications and to communicate data through a network, system, and/or domain. For example, the network interface 312 is configured for communication with a modem, a switch, a router, a bridge, a server, or a client. The processor 302 is configured to receive data using network interface 312 from a network or a remote source.

Microphone 314 is configured to capture audio signals (e.g. voice signals or commands) from a user and/or other people near the user. The microphone 314 is configured to capture audio signals continuously, at predetermined intervals, or on-demand. The microphone 314 is operably coupled to the voice recognition engine 320 and provides captured audio signals to the voice recognition engine 320 for processing, for example, to identify a voice command from the user.

The GPS sensor 316 is configured to capture and to provide geographical location information. For example, the GPS sensor 316 is configured to provide the geographic location of a user employing the augmented reality user device 300. The GPS sensor 316 is configured to provide the geographic location information as a relative geographic location or an absolute geographic location. The GPS sensor 316 provides the geographic location information using geographic coordinates (i.e. longitude and latitude) or any other suitable coordinate system.

Examples of biometric devices 317 include, but are not limited to, retina scanners, finger print scanners, voice recorders, and cameras. Biometric devices 317 are configured to capture information about a person's physical characteristics and to output a biometric signal 305 based on captured information. A biometric signal 305 is a signal that is uniquely linked to a person based on their physical characteristics. For example, a biometric device 317 may be configured to perform a retinal scan of the user's eye and to generate a biometric signal 305 for the user based on the retinal scan. As another example, a biometric device 317 is configured to perform a fingerprint scan of the user's finger and to generate a biometric signal 305 for the user based on the fingerprint scan. The biometric signal 305 is used by a physical identification verification engine 330 to identify and/or authenticate a person.

The processor 302 is implemented as one or more CPU chips, logic units, cores (e.g. a multi-core processor), FPGAs, ASICs, or DSPs. The processor 302 is communicatively coupled to and in signal communication with the memory 304, the camera 306, the display 308, the wireless communication interface 310, the network interface 312, the microphone 314, the GPS sensor 316, and the biometric devices 317. The processor 302 is configured to receive and transmit electrical signals among one or more of the memory 304, the camera 306, the display 308, the wireless communication interface 310, the network interface 312, the microphone 314, the GPS sensor 316, and the biometric devices 317. The electrical signals are used to send and receive data (e.g. images 232 and transfer tokens 124) and/or to control or communicate with other devices. For example, the processor 302 transmits electrical signals to operate the camera 306. The processor 302 may be operably coupled to one or more other devices (not shown).

The processor 302 is configured to process data and may be implemented in hardware or software. The processor 302 is configured to implement various instructions. For example, the processor 302 is configured to implement a virtual overlay engine 318, a voice recognition engine 320, a facial recognition engine 322, an object recognition engine 324, a gesture capture engine 326, a digital data transfer engine 328, a physical identification verification engine 330, and a gesture confirmation engine 331. In an embodiment, the virtual overlay engine 318, the voice recognition engine 320, the facial recognition engine 322, the object recognition engine 324, the gesture capture engine 326, the digital data transfer engine 328, the physical identification verification engine 330, and the gesture confirmation engine 331 is implemented using logic units, FPGAs, ASICs, DSPs, or any other suitable hardware.

The virtual overlay engine 318 is configured to overlay virtual objects onto tangible objects in a real scene using the display 308. For example, the display 308 may be a head-mounted display that allows a user to simultaneously view tangible objects in a real scene and virtual objects. The virtual overlay engine 318 is configured to process data to be presented to a user as an augmented reality virtual object on the display 308. An example of overlay virtual objects onto tangible objects in a real scene is shown in FIG. 1.

The voice recognition engine 320 is configured to capture and/or identify voice patterns using the microphone 314. For example, the voice recognition engine 320 is configured to capture a voice signal from a person and to compare the captured voice signal to known voice patterns or commands to identify the person and/or commands provided by the person. For instance, the voice recognition engine 320 is configured to receive a voice signal to authenticate a user and/or another person or to initiate a digital data transfer.

The facial recognition engine 322 is configured to identify people or faces of people using images 332 or video streams created from a series of images 332. In one embodiment, the facial recognition engine 322 is configured to perform facial recognition on an image 332 captured by the camera 306 to identify the faces of one or more people in the captured image 332. In another embodiment, the facial recognition engine 322 is configured to perform facial recognition in about real-time on a video stream captured by the camera 306. For example, the facial recognition engine 322 is configured to continuously perform facial recognition on people in a real scene when the camera 306 is configured to continuous capture images 332 from the real scene. The facial recognition engine 322 employs any suitable technique for implementing facial recognition as would be appreciated by one of ordinary skill in the art upon viewing this disclosure.

The object recognition engine 324 is configured to identify objects, object features, text, and/or logos using images 332 or video streams created from a series of images 332. In one embodiment, the object recognition engine 324 is configured to identify objects and/or text within an image 332 captured by the camera 306. In another embodiment, the object recognition engine 324 is configured to identify objects and/or text in about real-time on a video stream captured by the camera 306 when the camera 306 is configured to continuously capture images 332. The object recognition engine 324 employs any suitable technique for implementing object and/or text recognition as would be appreciated by one of ordinary skill in the art upon viewing this disclosure.

The gesture recognition engine 326 is configured to identify gestures performed by a user and/or other people. Examples of gestures include, but are not limited to, hand movements, hand positions, finger movements, head movements, audible gestures, and/or any other actions that provide a signal from a person. For example, gesture recognition engine 326 is configured to identify hand gestures provided by a user 105 to indicate that the user 105 executed a document. For example, the hand gesture may be a signing gesture associated with a stylus, a camera, and/or a data glove. As another example, the gesture recognition engine 326 is configured to identify an audible gesture from a user 105 that indicates that the user 105 executed virtual file document 120. The gesture recognition engine 326 employs any suitable technique for implementing gesture recognition as would be appreciated by one of ordinary skill in the art upon viewing this disclosure.

The physical identification verification engine 330 is configured to identify a person based on a biometric signal 305 generated from the person's physical characteristics. The physical identification verification engine 330 employs one or more biometric devices 317 to identify a user based on one or more biometric signals 305. For example, the physical identification verification engine 330 receives a biometric signal 305 from the biometric device 317 in response to a retinal scan of the user's eye, a fingerprint scan of the user's finger, an audible voice capture, and/or a facial image capture. The physical identification verification engine 330 compares biometric signals 305 from the biometric device 317 to previously stored biometric signals 305 for the user to authenticate the user. The physical identification verification engine 330 authenticates the user when the biometric signals 305 from the biometric devices 317 substantially matches (e.g. is the same as) the previously stored biometric signals 305 for the user. In some embodiments, physical identification verification engine 330 includes voice recognitions engine 320 and/or facial recognition engine 322.

Gesture confirmation engine 331 is configured to receive a signor identity confirmation token, communicate a signor identity confirmation token, and display the gesture motion from the signor. Gesture confirmation engine 331 may facilitate allowing a witness, such as a notary public or an uninterested witness, to confirm that the signor executed the document. Gesture engine 331 may instruct AR user device 110 to display the signor's digital signature 135 on virtual file document 120. Gesture confirmation engine 331 may instruct AR user device 110 to display the gesture motion from the signor in any suitable way including displaying via audio, displaying via an image such as video or a still image, or displaying via virtual overlay.

The memory 304 comprises one or more disks, tape drives, or solid-state drives, and may be used as an over-flow data storage device, to store programs when such programs are selected for execution, and to store instructions and data that are read during program execution. The memory 304 may be volatile or non-volatile and may comprise ROM, RAM, TCAM, DRAM, and SRAM. The memory 304 is operable to store transfer tokens 125, biometric signals 305, virtual overlay instructions 336, voice recognition instructions 338, facial recognition instructions 340, object recognition instructions 342, gesture recognition instructions 344, digital data transfer instructions 346, biometric instructions 347, and any other data or instructions.

Biometric signals 305 are signals or data that is generated by a biometric device 317 based on a person's physical characteristics. Biometric signal 305 are used by the AR user device 110 to identify and/or authenticate an AR user device 110 user by comparing biometric signals 305 captured by the biometric devices 317 with previously stored biometric signals 305.

Transfer tokens 125 are generated by the digital data transfer engine 328 and sent to other AR user device 110, server 140, and/or any other suitable component of system 100. The transfer tokens 125 may comprise any suitable information for remote document execution. For example, the transfer tokens 125 may comprise an identification 130 and/or a digital signature 130, as discussed. In particular embodiments, transfer tokens 125 are encoded or encrypted to obfuscate and mask information being communicated across a network. Masking the information being communicated protects users and their information in the event of unauthorized access to the network and/or data occurs.

The virtual overlay instructions 336, the voice recognition instructions 338, the facial recognition instructions 340, the object recognition instructions 342, the gesture recognition instructions 344, the digital data transfer instructions 346, and the biometric instructions 347 each comprise any suitable set of instructions, logic, rules, or code operable to execute virtual overlay engine 318, the voice recognition engine 320, the facial recognition engine 322, the object recognition engine 324, the gesture recognition capture 326, the digital data transfer engine 328, and the physical identification verification engine 330, respectively.

Figure 4:
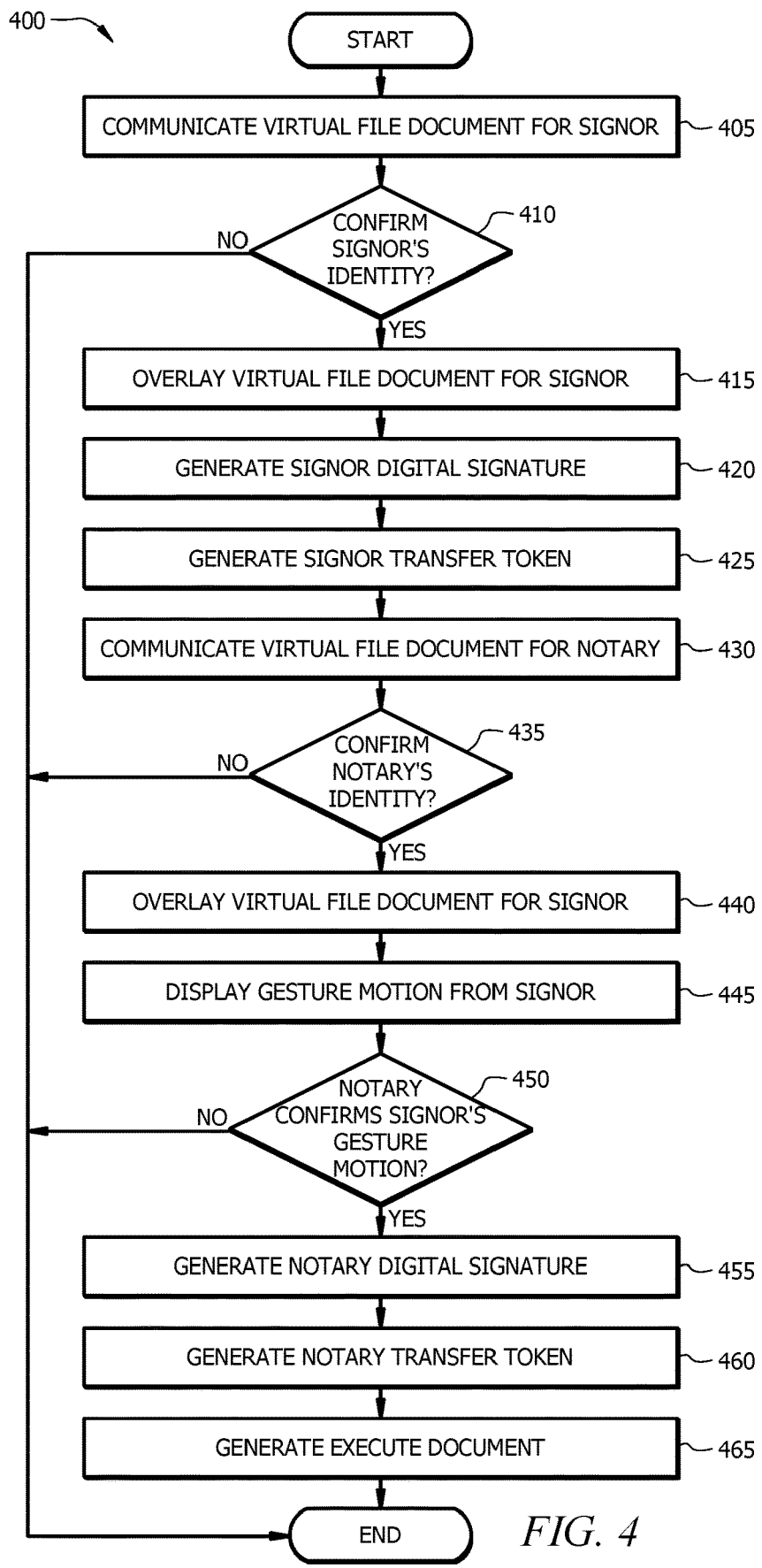
FIG. 4 is a flowchart of an augmented reality digital data transfer method, in particular embodiments.

FIG. 4 is a flowchart of an augmented reality digital data transfer method, in particular embodiments. The method starts at step 405 where server 140 communicates virtual file document 120 to a signor. Virtual file document 120 may be a document to be executed by the signor. Server 140 may communicate virtual file document 120 to a first AR user device 110 associated with the signor. The method proceeds to step 410 where the first AR user device 110 confirms the signor's identity. As discussed, the first AR user device 110 may confirm the signor's identity using biometric data from the signor. The received biometric data for the signor may be compared to predetermined biometric data for the signor to authenticate the signor's identity. If the first AR user device 110 does not confirm the signor's identity, the method ends. If the first AR user device 110 does confirm the signor's identity, the first AR user device 110 generates an identification token 130 for the signor indicating the confirmation of the signor's identity, and the method proceeds to step 415 where the first AR user device displays the virtual file document for the signor. The first AR user device 110 displays virtual file document 120 to the signor. For example, the first AR user device 110 may use a head-mounted display to overlay the virtual file document onto a tangible object.

The signor may view virtual file document 120 and execute the document. For example, the signor may perform a gesture motion representing a signature on virtual file document 120 to execute virtual file document 120. At step 420, the first AR user device 110 generates a digital signature 135 for the signor based on the gesture motion.

At step 430, virtual file document 120 is communicated to a second AR user device 110 associated with a witness. For example, the witness may be a notary public. The second AR user device 110 confirms the notary's identity by receiving biometric data for the notary and comparing the received biometric data to predetermined biometric data for the notary. The second AR user device 110 generates an identification token 130 for the notary in response to the confirmation as previously discussed. If the second AR user device does not confirm the notary's identity, the method ends. At step 440 the second AR user device 110 displays virtual file document 120 to the notary. For example, the second AR user device 110 displays virtual file document 120 to the signor. The first AR user device 110 may use a head-mounted display to overlay the virtual file document onto a tangible object.

The second AR user device 110 communicates the signor's digital signature 135 and/or identification token 130 to the notary at step 445. The notary views uses identification token 130 to authenticate the signor's identity. The notary then uses digital signature 135 to confirm that the signor executed the document (e.g., by viewing the signor executing the document). If the notary does not confirm that the signor executed the document at step 450, the method ends. If the notary does confirm that the signor executed the document at step 450, the method proceeds to step 455 where the notary makes a gesture motion representing a signature on virtual file document 120, and the second AR user device generates a digital signature 135 for the notary using the gesture motion. The second AR user device generates a transfer token 125 for the notary at step 460, wherein the transfer token 125 comprises the identification token 130 and digital signature 135 for the notary. The second AR user device 110 communicates the transfer token 125 to server 140. At step 465, server 140 receives tokens from the witness and the notary and stores the tokens as tokens 165. Server 140 may store the transfer token 125 for the signor, the identification token 130 for the signor, the digital signature 135 for the signor, the transfer token 125 for the notary, the identification token 130 for the notary, and/or the digital signature 130 for the notary as tokens 165. Server 140 generates executed document 170 using the virtual file document 120 and tokens 165 at step 465 before the method ends. For example, server 140 may generate a single file comprising virtual file document 120 and one or more tokens 165 to generated executed document 170. As another example, server 140 may extract one or more digital signatures 135 from tokens 165 and overlay the digital signatures 135 onto virtual file document 120 to create executed document 170.

Modifications, additions, or omissions may be made to method 400 depicted in FIG. 4. Method 400 may include more, fewer, or other steps. For example, steps may be performed in parallel or in any suitable order. While discussed as a notary facilitating performing the steps, any suitable any party may confirm a signor's document execution, including a notary and/or an uninterested witness. Any suitable number of parties may execute virtual file document 120 and any suitable number of parties may confirm that one or more other parties executed virtual file document 120. A party who confirms that a signor executed virtual file document 120 may do so in real-time as the document is executed or at a time after the signor executed the document. For example, if a notary is not available to notarize virtual file document 120 in real-time as a signor executes the document. A notary may view tokens communicated from an AR user device 110 at a later time to notarize the virtual file document 120.

Although the present disclosure includes several embodiments, a myriad of changes, variations, alterations, transformations, and modifications may be suggested to one skilled in the art, and it is intended that the present disclosure encompass such changes, variations, alterations, transformations, and modifications as fall within the scope of the appended claims.

The invention claimed is:

1. An augmented reality system comprising:
a server comprising a memory operable to store a virtual file folder, the virtual file folder comprising a virtual file document;
a first augmented reality user device for a signor comprising:
  a first display configured to overlay the virtual file document onto a tangible object in real-time; and
  a first gesture capture engine operable to:
    capture a gesture motion from the signor, the gesture motion representing a signor digital signature on the virtual file document; and
    generate a signor transfer token, the signor transfer token comprising the signor digital signature;
a second augmented reality user device for a notary comprising:
  a second display configured to overlay the virtual file document onto a tangible object in real-time;
  a gesture confirmation engine operable to display, via the second display, the gesture motion from the signor, the gesture motion from the signor displayed on the virtual file document; and
  a second gesture capture engine operable to:
    capture a gesture motion from the notary, the gesture motion from the notary representing a notary digital signature on the virtual file document; and
    generate a notary transfer token, the notary transfer token comprising the notary digital signature; and
the server further comprising:
  an interface operable to receive the signor transfer token and the notary transfer token; and
  a processor operable to:
    generate an executed document using the signor transfer token, the notary transfer token, and the virtual file document; and
    store the executed document in the virtual file folder.

2. The augmented reality system of claim 1, wherein the first gesture capture engine comprises at least one of a first capture camera, a first stylus, and a first data glove.

3. The augmented reality system of claim 1, further comprising a biometric database comprising predetermined biometric data for the signor and operable to communicate the predetermined biometric data for the signor to a first physical identification verification engine.

4. The augmented reality system of claim 1, wherein the second augmented reality user device displays the gesture motion from the signor in real-time as the gesture motion from the signor occurs.

5. The augmented reality system of claim 1, wherein:
the server is further operable to:
  receive the signor transfer token at a first time;
  receive a request for the signor transfer token from the second augmented reality user device; and
  communicate the signor transfer token to the second augmented reality user device in response to the request; and
the second augmented reality user device is further operable display the gesture motion from the signor at a second time that is later than the first time.

6. The augmented reality system of claim 1, further comprising a third augmented reality user device for a witness comprising:
a third display configured to overlay the virtual file document onto a tangible object in real-time;
a gesture confirmation engine operable to display, via the third display, the gesture motion from the signor, the gesture motion from the signor displayed on the virtual file document;
a third gesture capture engine operable to:
  capture a gesture motion from the witness, the gesture motion from the witness representing a witness digital signature on the virtual file document; and
  generate a witness transfer token, the witness transfer token comprising the witness digital signature.

7. An augmented reality digital data transfer method comprising:
overlaying, by a first augmented reality user device for a signor, a virtual file document onto a tangible object in real time;
capturing, by the first augmented reality user device, a gesture motion from the signor, the gesture motion representing a signor digital signature on the virtual file document;
generating, by the first augmented reality user device, a signor transfer token, the signor transfer token comprising the signor digital signature;
displaying, by a second augmented reality user device, the gesture motion from the signor, the gesture motion from the signor displayed on the virtual file document;
capturing, by the second augmented reality user device, a gesture motion from a notary, the gesture motion from the notary representing a notary digital signature on the virtual file document;
generating, by the second augmented reality user device, a notary transfer token, the notary transfer token comprising the notary digital signature;
receiving, by a network device, the signor transfer token and the notary transfer token;
generating, by the network device, an executed document using the signor transfer token, the notary transfer token, and the virtual file document; and
storing, by the network device, the executed document in the virtual file folder.

8. The method of claim 7, wherein, the gesture motion from the signor is captured using at least one of a first capture camera, a first stylus, and a first data glove.

9. The method of claim 7, wherein the gesture motion from the signor is displayed to the notary in real-time as the gesture motion from the signor occurs.

10. The method of claim 7, further comprising:
receiving, by a server, the signor transfer token at a first time;
receiving, by the server, a request for the signor transfer token from the second augmented reality user device;
communicating, by the server, the signor transfer token to the second augmented reality user device in response to the request; and
displaying, by the second augmented reality user device, the gesture motion from the signor to the notary at a second time that is later than the first time.

11. The method of claim 7, further comprising:
overlaying, by a third augmented reality user device for a witness, the virtual file document onto a tangible object for a witness in real-time;
displaying, by the third augmented reality user device, the gesture motion from the signor, the gesture motion from the signor displayed on the virtual file document;
capturing, by the third augmented reality user device, a gesture motion from the witness, the gesture motion from the witness representing a witness digital signature on the virtual file document; and
generating, by the third augmented reality user device, a witness transfer token, the witness transfer token comprising the witness digital signature.

12. An augmented reality user device comprising:
a display configured to overlay a virtual file document onto a tangible object in real-time;
a gesture confirmation engine operable to display, via the display, a gesture motion from the signor, the gesture motion from the signor displayed on the virtual file document;
a gesture capture engine operable to:
capture a gesture motion from the witness, the gesture motion from the witness representing a witness digital signature on the virtual file document; and
generate a witness transfer token, the witness transfer token comprising the witness digital signature; and
an interface operable to communicate the witness transfer token to a server.

13. The apparatus of claim 12, wherein, the gesture capture engine comprises at least one of a first capture camera, a first stylus, and a first data glove.

14. The apparatus of claim 12, wherein the augmented reality user device displays the gesture motion from the signor in real-time as the gesture motion from the signor occurs.

15. The apparatus of claim 12, wherein the augmented reality user device is further operable to:
communicate a request for the signor transfer token at a first time;
receive the signor transfer token in response to the request; and
display the gesture motion from the signor at a second time that is later than the first time.

\* \* \* \* \*